(12) United States Patent
Sakano

(10) Patent No.: US 11,736,810 B2
(45) Date of Patent: Aug. 22, 2023

(54) SOLID-STATE IMAGING DEVICE, METHOD OF DRIVING SOLID-STATE IMAGING DEVICE, AND ELECTRONIC DEVICE

(71) Applicant: SONY SEMICONDUCTOR SOLUTIONS CORPORATION, Kanagawa (JP)

(72) Inventor: Yorito Sakano, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/759,146

(22) PCT Filed: Jan. 20, 2021

(86) PCT No.: PCT/JP2021/001808
§ 371 (c)(1),
(2) Date: Jul. 20, 2022

(87) PCT Pub. No.: WO2021/153370
PCT Pub. Date: Aug. 5, 2021

(65) Prior Publication Data
US 2023/0052637 A1 Feb. 16, 2023

(30) Foreign Application Priority Data
Jan. 29, 2020 (JP) .................................. 2020-012993

(51) Int. Cl.
*H04N 23/745* (2023.01)
*H04N 25/713* (2023.01)
(52) U.S. Cl.
CPC ......... *H04N 23/745* (2023.01); *H04N 25/713* (2023.01)

(58) Field of Classification Search
CPC .... H04N 23/745; H04N 25/713; H04N 25/53; H04N 25/59; H04N 25/621;
(Continued)

(56) References Cited

U.S. PATENT DOCUMENTS 7,821,560 B2 * 10/2010 Sugawa ............... H04N 25/587
348/308
8,625,010 B2 * 1/2014 Yamashita ............. H04N 25/62
348/297

(Continued)

FOREIGN PATENT DOCUMENTS

JP 3071891 B2 7/2000
JP 2006-253876 A 9/2006
(Continued)

OTHER PUBLICATIONS

International Search Report and Written Opinion of PCT Application No. PCT/JP2021/001808, dated Mar. 16, 2021, 08 pages of ISRWO.

*Primary Examiner* — Abdelaaziz Tissire
(74) *Attorney, Agent, or Firm* — Chip Law Group

(57) ABSTRACT

A solid-state imaging device according to an embodiment includes a photoelectric conversion unit, a charge transfer unit configured to transfer a charge accumulated in the photoelectric conversion unit, a first charge modulation unit to which the charge is transferred from the photoelectric conversion unit by the charge transfer unit, a second charge modulation unit, a charge accumulation unit configured to accumulate a charge overflowing from the photoelectric conversion unit during an accumulation period, a modulation switching unit configured to couple or divide the first charge modulation unit and the second charge modulation unit, and a capacitance connection unit configured to couple or divide the second charge modulation unit and the charge accumulation unit, in which, in a state of the first charge (Continued)

modulation unit alone and a state where the first charge modulation unit and the second charge modulation unit are coupled by the modulation switching unit, the charge accumulated in the photoelectric conversion unit is modulated into a voltage signal, and voltage signals having different conversion efficiencies are continuously read, and the charge accumulated in the photoelectric conversion unit and the charge overflowing from the photoelectric conversion unit during the accumulation period are modulated into a voltage signal and the voltage signal is read in a capacitance obtained by coupling the first charge modulation unit, the second charge modulation unit, and the charge accumulation unit.

8 Claims, 15 Drawing Sheets

(58) Field of Classification Search
CPC .. H04N 25/616; H04N 25/709; H04N 25/767; H04N 25/771; H04N 25/79; H01L 27/14603; H01L 27/14614; H01L 27/14643
See application file for complete search history.

(56) References Cited

U.S. PATENT DOCUMENTS

| | | | |
|---|---|---|---|
| 10,341,592 B2* | 7/2019 | Yanagita | H01L 27/14636 |
| 10,748,945 B2* | 8/2020 | Oka | H04N 25/57 |
| 10,880,505 B2* | 12/2020 | Toyofuku | H04N 25/57 |
| 2007/0035649 A1* | 2/2007 | McKee | H04N 25/59 |
| | | | 348/E3.018 |
| 2007/0290238 A1* | 12/2007 | Adachi | H04N 25/59 |
| | | | 348/E3.018 |
| 2014/0077059 A1* | 3/2014 | Sakano | H04N 25/573 |
| | | | 250/208.1 |
| 2018/0241955 A1* | 8/2018 | Sakano | H04N 25/59 |

FOREIGN PATENT DOCUMENTS

| | | | |
|---|---|---|---|
| JP | 4317115 B2 | 8/2009 | |
| JP | 4973115 B2 | 7/2012 | |
| JP | 5066704 B2 | 11/2012 | |
| JP | 2019-146071 A | 8/2019 | |
| WO | 2018/221261 A1 | 12/2018 | |

* cited by examiner

SOLID-STATE IMAGING DEVICE, METHOD OF DRIVING SOLID-STATE IMAGING DEVICE, AND ELECTRONIC DEVICE

CROSS REFERENCE TO RELATED APPLICATIONS

This application is a U.S. National Phase of International Patent Application No. PCT/JP2021/001808 filed on Jan. 20, 2021, which claims priority benefit of Japanese Patent Application No. JP 2020-012993 filed in the Japan Patent Office on Jan. 29, 2020. Each of the above-referenced applications is hereby incorporated herein by reference in its entirety.

TECHNICAL FIELD

The present disclosure relates to a solid-state imaging device, a method of driving a solid-state imaging device, and an electronic device.

BACKGROUND ART

In in-vehicle image sensors, a problem called "LED flicker" has been highlighted, in which a blinking object such as an LED light source cannot be imaged depending on blinking timing. This LED flicker is a defect that occurs because a conventional image sensor has a low dynamic range and needs to adjust an exposure time for each object.

By the way, to cope with objects with various illuminances, the exposure time is set to be long for a low-illuminance object, and the exposure time is set to be short for a high-illuminance object. In this way, the image sensors are devised to be able to cope with various objects even in a low dynamic range.

Meanwhile, reading speed is constant regardless of the exposure time. For this reason, in a case of setting the exposure time in a unit shorter than a readout time, light incident on a photodiode at timing other than the exposure time is photoelectrically converted into charges but is not read out after charge-voltage conversion and discarded. Therefore, even if the LED light source blinks in an invalid period other than the exposure time, the LED light source cannot be imaged and the LED flicker occurs.

To cope with the LED flicker, the dynamic range needs to be expanded. Various dynamic range expansion techniques are known, and examples thereof include a time division method (see, for example, Patent Document 1), a space division method (see, for example, Patent Document 2), and a method of providing a memory in a pixel to directly increase an amount of charge handled (see, for example, Patent Document 3).

CITATION LIST

Patent Document

Patent Document 1: Japanese Patent No. 4973115
Patent Document 2: Japanese Patent No. 3071891
Patent Document 3: Japanese Patent Application Laid-Open No. 2006-253876
Patent Document 4: Japanese Patent No. 4317115
Patent Document 5: Japanese Patent No. 5066704

SUMMARY OF THE INVENTION

Problems to be Solved by the Invention

For example, image synthesis is essential to ensure the dynamic range of 120 dB, for example, but artifacts of moving objects cannot be avoided in the time division method. In a case of not using the time division method, sensitivity difference and capacitance difference are used, but it has been difficult to obtain a sufficient dynamic range only by the sensitivity difference and the capacitance difference due to miniaturization of pixels.

Furthermore, even in the case of expanding the dynamic range on a high-illuminance side by providing a memory in a pixel to increase the amount of charge handled (see, for example, Patent Documents 4 and 5), a low-illuminance characteristic is required at the same time, but to increase conversion efficiency and secure the low-illuminance characteristic, the capacity of floating diffusion needs to be reduced as much as possible. However, if the capacitance of the floating diffusion is reduced, a photocharge accumulated in a photodiode cannot be completely received. At this time, the photocharge that cannot be completely received is combined with the photocharge accumulated in the in-pixel capacitance and read out. However, since signal reading from the in-pixel capacitance is performed by delta data sampling, the signal is easily affected by kTC noise and white and dark currents caused by an interface state, and the photocharge that is accumulated in the photodiode and can be originally read out by correlated double sampling is wasted.

The present invention has been made in view of the foregoing, and an object of the present invention is to provide a solid-state imaging device, a method of driving a solid-state imaging device, and an electronic device that are excellent in low-illuminance characteristics and capable of expanding a dynamic range.

Solutions to Problems

A solid-state imaging device according to an embodiment includes a photoelectric conversion unit; a charge transfer unit configured to transfer a charge accumulated in the photoelectric conversion unit; a first charge modulation unit to which the charge is transferred from the photoelectric conversion unit by the charge transfer unit; a second charge modulation unit; a modulation switching unit configured to couple or divide the first charge modulation unit and the second charge modulation unit; a charge accumulation unit configured to accumulate a charge overflowing from the photoelectric conversion unit during an accumulation period; and a capacitance connection unit configured to couple or divide the second charge modulation unit and the charge accumulation unit, in which, in a state of the first charge modulation unit alone and a state where the first charge modulation unit and the second charge modulation unit are coupled by the modulation switching unit, the charge accumulated in the photoelectric conversion unit is modulated into a voltage signal, and voltage signals having different conversion efficiencies are continuously read, and further, the charge accumulated in the photoelectric conversion unit and the charge overflowing from the photoelectric conversion unit during the accumulation period are modulated into a voltage signal and the voltage signal is read in a capacitance obtained by coupling the first charge modulation unit, the second charge modulation unit, and the charge accumulation unit by the modulation switching unit and the capacitance connection unit.

MODE FOR CARRYING OUT THE INVENTION

Hereinafter, embodiments will be described in detail with reference to the drawings.

First Embodiment

Figure 1:
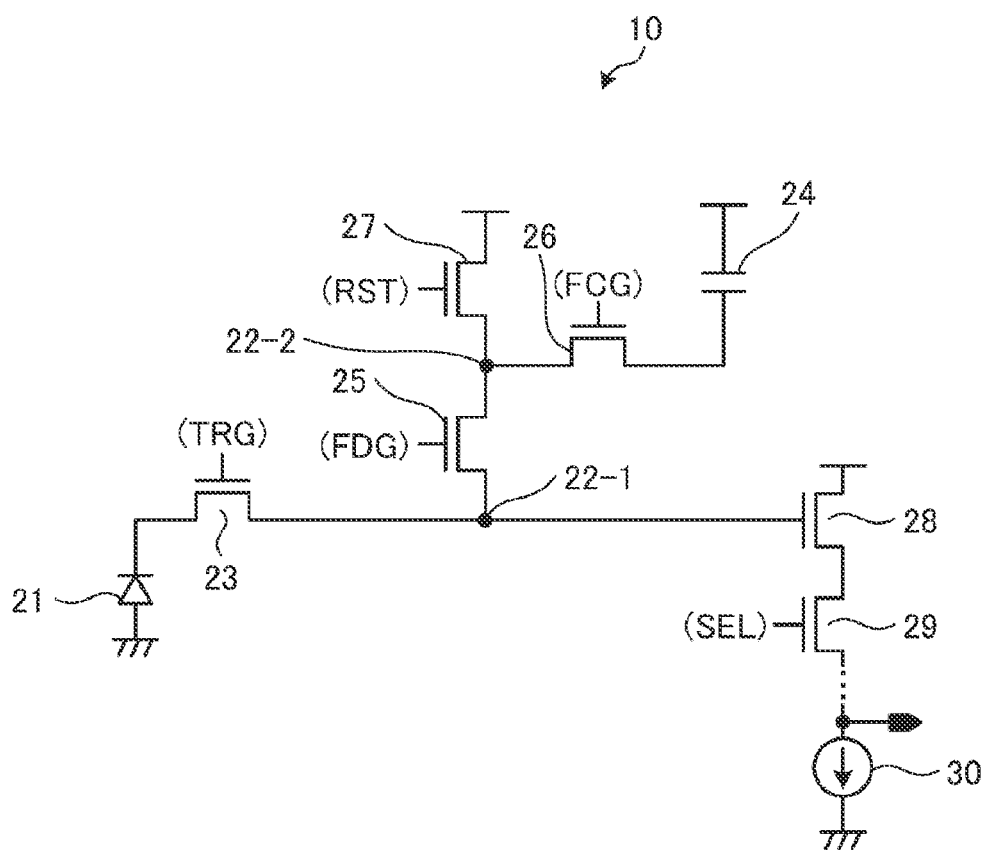
FIG. 1 is a schematic configuration diagram illustrating an example of a pixel constituting a solid-state imaging device according to a first embodiment.

FIG. 1 is a schematic configuration diagram illustrating an example of a pixel constituting a solid-state imaging device according to a first embodiment.

A plurality of (for example, N rows×M columns. N and M are integers of 2 or larger) pixels 10 is provided to constitute a pixel array unit in the solid-state imaging device. Then, the pixel 10 photoelectrically converts incident light and generates a pixel signal corresponding to the amount of received incident light.

For example, as illustrated in FIG. 1, the pixel 10 includes a photodiode 21 as a photoelectric conversion unit, a floating diffusion (FD) region 22-1 as a first charge modulation unit, a floating diffusion region 22-2 as a second charge modulation unit, a transfer transistor 23 as a charge transfer unit, an in-pixel capacitance 24 as a charge accumulation unit, a conversion efficiency switching transistor 25 as a modulation switching unit, an accumulation transistor 26 as a capacitance connection unit, a reset transistor 27, an amplification transistor 28, and a selection transistor 29.

In the above configuration, the photodiode 21 generates a charge according to the amount of received incident light.

The floating diffusion region 22 and the in-pixel capacitance 24 accumulate a photocharge overflowing from the photodiode 21 during a charge accumulation period.

The transfer transistor 23 transfers the photocharge accumulated in the photodiode 21 to the floating diffusion region 22.

The conversion efficiency switching transistor 25 modulates the photocharge accumulated in the photodiode 21 to a voltage signal in a state of only the floating diffusion region 22-1 and in a state where the floating diffusion region 22-1 and the floating diffusion region 22-2 are potential-coupled, thereby switching the conversion efficiency.

The accumulation transistor 26 functions as a capacitance connection unit, and couples or divides the potential between the floating diffusion region 22 and the in-pixel capacitance 24.

The reset transistor 27 resets the accumulated charge and shifts to an initial state.

The amplification transistor 28 amplifies the voltage signal obtained by modulating the charge and outputs the amplified voltage signal as a pixel signal.

The selection transistor 29 has a low potential side connected to a constant current source 30, and outputs the pixel signal output from the amplification transistor 28 to a subsequent stage at the time of conduction.

Figure 2:
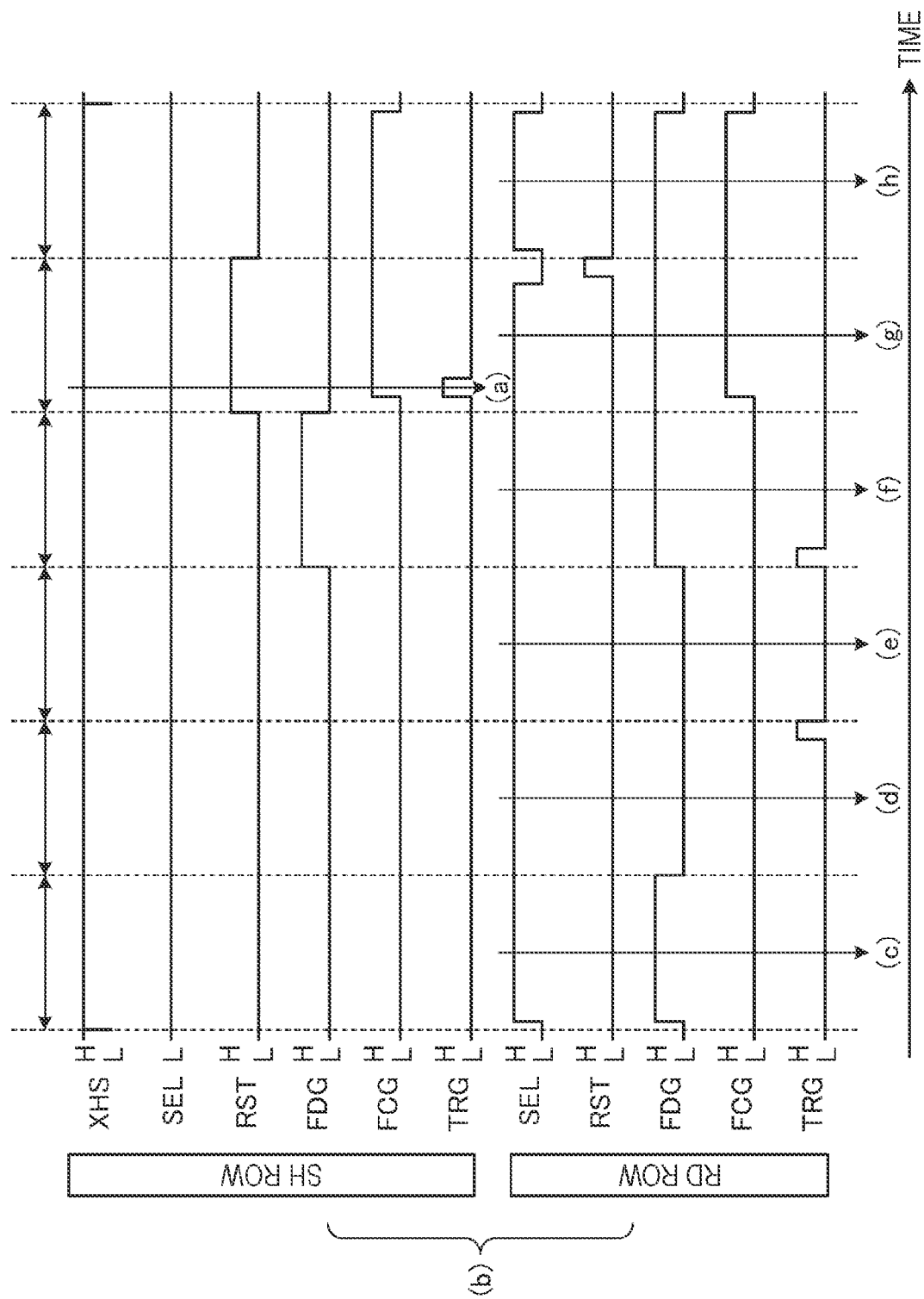
FIG. 2 is a processing timing chart of the first embodiment.

FIG. 2 is a processing timing chart of the first embodiment.

In FIG. 2, an upper stage is a processing timing chart of pixels corresponding to a row (SH row) where an exposure start operation is performed, and a lower stage is a processing timing chart of pixels corresponding to a row (RD row) where a signal read operation is performed.

Figure 3A:
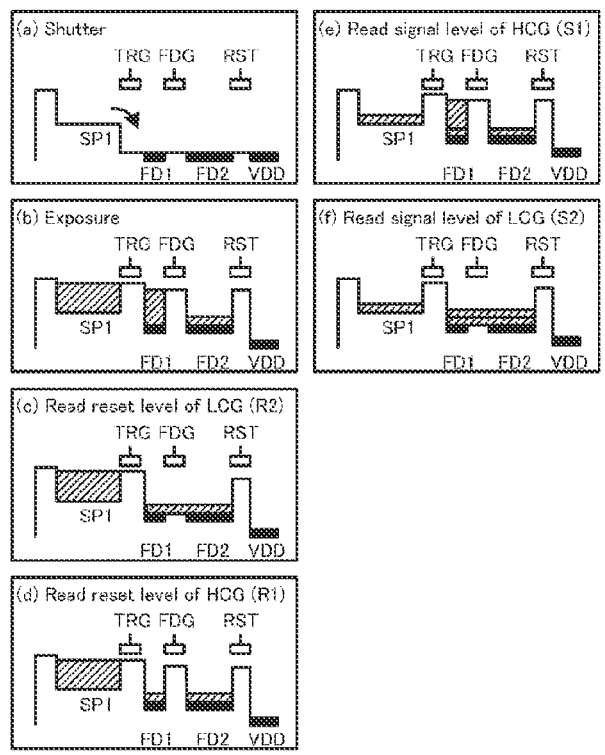
FIG. 3A is potential diagrams according to the first embodiment.
Figure 3B:
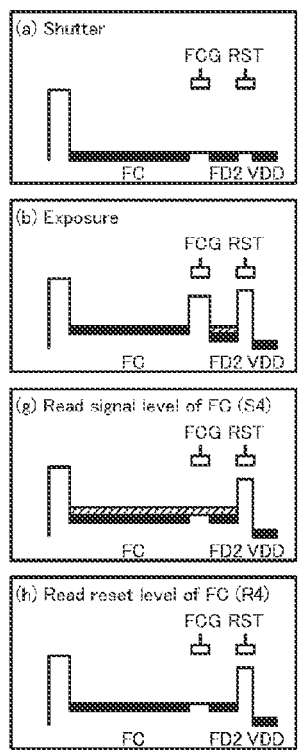
FIG. 3B is potential diagrams according to the first embodiment.

FIGS. 3A and 3B are potential diagrams according to the first embodiment.

In the exposure start operation, at the timing indicated by the arrow (a) in FIG. 2, the accumulation transistor 26 is set to an on state (conductive state) by a control signal FCG, the reset transistor 27 is set to the on state (conductive state) by a control signal RST, and the charge accumulated in the in-pixel capacitance 24 is set to a reset state, as illustrated in FIG. 3B(a), and the transfer transistor 23 is set to the on state (conductive state) by a control signal TRG, and the conversion efficiency switching transistor 25 is set to the on state (conductive state) by a control signal FDG, so that the charge accumulated in the photodiode 21 is also set to the reset state, as illustrated in FIG. 3A(a).

Then, as indicated by reference sign (b) in FIG. 2, exposure is performed between the row (SH row) where the exposure start operation is performed and the row (RD row) where the signal read operation is performed as illustrated in FIGS. 3A(b) and 3B(b).

Then, after a certain exposure time, the selection transistor 29 is set to the on state by a control signal SEL to start the signal read operation. Then, the conversion efficiency switching transistor 25 is set to the on state (conductive state) by the control signal FDG, and at the timing indicated by the arrow (c) in FIG. 2, a reset level R2 at low conversion efficiency is acquired, as illustrated in FIG. 3A(c).

At this time, at the timing indicated by the arrow (c) in FIG. 2, the potentials of the floating diffusion region 22-1 (indicated by reference sign FD1 in FIG. 3A) and the floating diffusion region 22-2 (indicated by reference sign FD2 in FIGS. 3A and 3B) are coupled as illustrated in FIG. 3A(c).

In this case, the potentials of the floating diffusion region 22-1 (indicated by reference sign FD1 in FIG. 3A) and the floating diffusion region 22-2 (indicated by reference sign FD2 in FIGS. 3A and 3B) are supplied as a gate voltage of the amplification transistor 28, and the gate voltage is supplied as a pixel signal to the subsequent stage (for example, an AD converter) via the selection transistor 29 and a vertical signal line.

Next, at the timing indicated by the arrow (d) in FIG. 2, the conversion efficiency switching transistor 25 is set to an off state (non-conductive state) by the control signal FDG, and a reset level R1 at high conversion efficiency is acquired, as illustrated in FIG. 3A(d).

Next, the transfer transistor 23 is set to the on state (conductive state) by the control signal TRG to transfer the charge accumulated in the photodiode 21 to the floating diffusion region 22-1, and is then set to the off state (non-conductive state) by the control signal TRG.

Next, at the timing indicated by the arrow (e) in FIG. 2, a signal level S1 at high conversion efficiency is acquired as illustrated in FIG. 3A(e).

Next, at the timing indicated by the arrow (f) in FIG. 2, the conversion efficiency switching transistor 25 is set to the on state (conductive state) by the control signal FDG and at the same time, the transfer transistor 23 is set to the on state (conductive state) again by the control signal TRG, so that all the charges accumulated in the photodiode 21 are transferred to the floating diffusion region 22, and then, the transfer transistor 23 is set to the off state (non-conductive state) by the control signal TRG, and then a signal level S2 at low conversion efficiency is read, as illustrated in FIG. 3A(f).

Here, in the case of high illuminance, the photocharge overflowing from the photodiode 21 is accumulated in the in-pixel capacitance 24. Therefore, at the timing indicated by the arrow (g) in FIG. 2, the in-pixel capacitance 24, the floating diffusion region 22-1, and the floating diffusion region 22-2 are potential-coupled by setting the accumulation transistor in the on state (conductive state) by the control signal FCG, and a signal level S4 is read out, as illustrated in FIG. 3B(g).

Next, in a state where the selection transistor 29 is set to the off state by the control signal SEL, the reset transistor 27 is set to the on state (conductive state) by the control signal RST, and the accumulated charge is set to the reset state.

Then, the reset transistor is set to the off state (non-conductive state) by the control signal RST, and a reset level R4 is acquired as illustrated in FIG. 3B(h) at the timing indicated by the arrow (h) in FIG. 2.

For a difference between the signal level S1 at high conversion efficiency and the reset level R1 at high conversion efficiency, that is, for S1-R1, an image signal is generated by correlated double sampling (CDS).

Similarly, for a difference between the signal level S4 and the reset level R4, that is, for S4-R4, an image signal is generated by delta data sampling (DDS).

In contrast, for a difference between the signal level S2 at low conversion efficiency and the reset level R2 at low conversion efficiency, that is, for S2-R2, an image signal is generated by the correlated double sampling (CDS), but the signal level S2 at low conversion efficiency and the reset level R2 at low conversion efficiency are not continuously read, and thus the reset level R2 at low conversion efficiency needs to be temporarily held in a line memory or the like.

As a result, by combining three images corresponding to the image signals corresponding to S1-R1, S2-R2, and S4-R4, it is possible to configure an image having excellent low-illuminance characteristics, a high dynamic range, and no artifact of the object.

As described above, according to the first embodiment, in the state of the floating diffusion region 22-1 alone functioning as the first charge modulation unit, and in the state where the floating diffusion region 22-1 functioning as the first charge modulation unit and the floating diffusion region 22-2 functioning as the second charge modulation unit are coupled by the conversion efficiency switching transistor 25 functioning as the modulation switching unit, the charge accumulated in the photodiode 21 functioning as the photoelectric conversion unit is modulated into the voltage signal and the (high conversion efficiency and low conversion efficiency) voltage signals having different conversion efficiencies are continuously read. Moreover, the charge accumulated in the photodiode 21 functioning as the photoelectric conversion unit and the charge overflowing from the photodiode 21 and accumulated in the in-pixel capacitance 24 during the accumulation period are modulated into the voltage signal and the voltage signal read in the capacitance in which the floating diffusion region 22-1, the floating diffusion region 22-2, and the in-pixel capacitance 24 are coupled by the conversion efficiency switching transistor 25 functioning as the modulation switching unit and the accumulation transistor 26 functioning as the capacitance connection unit. Therefore, excellent low-illuminance characteristics and an expanded high dynamic range can be obtained.

[1.1] First Modification of First Embodiment

Figure 4:
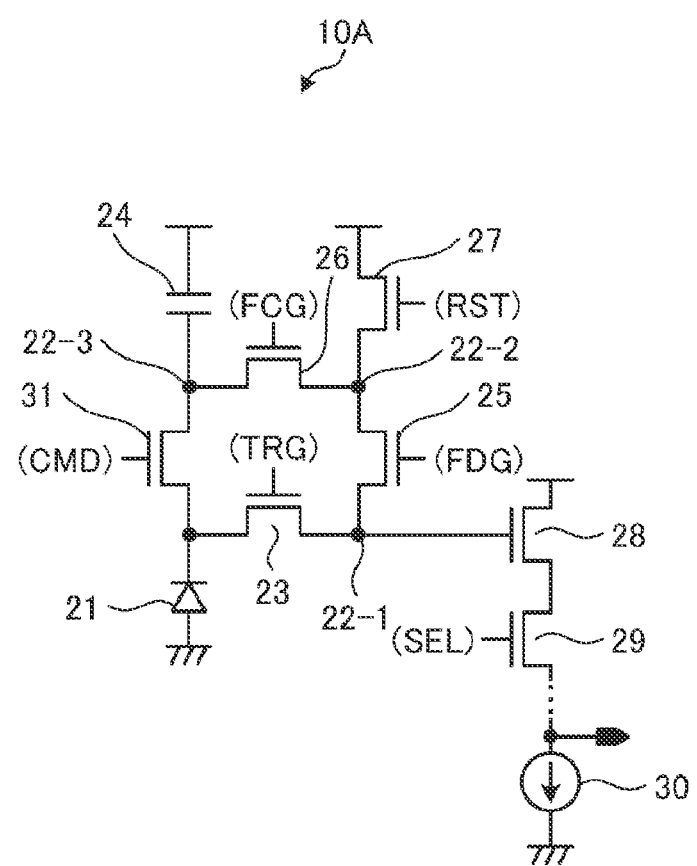
FIG. 4 is a schematic configuration diagram illustrating an example of a pixel constituting a solid-state imaging device according to a first modification of the first embodiment.

FIG. 4 is a schematic configuration diagram illustrating an example of a pixel constituting a solid-state imaging device according to a first modification of the first embodiment.

A pixel 10A of FIG. 4 is different from the pixel 10 of the first embodiment of FIG. 1 in that a second accumulation transistor 31 functioning as a third charge transfer unit is provided between the photodiode 21 and the in-pixel capacitance 24.

As described above, according to the configuration provided with the second accumulation transistor 31, the floating diffusion region 22-1 and the floating diffusion region 22-2 can be reset before the charge accumulated in the photodiode 21 is read, which is advantageous in terms of charge transfer from the photodiode 21 to the floating diffusion region 22-1 and the floating diffusion region 22-2 and dark current white spots of the floating diffusion region 22-1 and the floating diffusion region 22-2.

Figure 5:
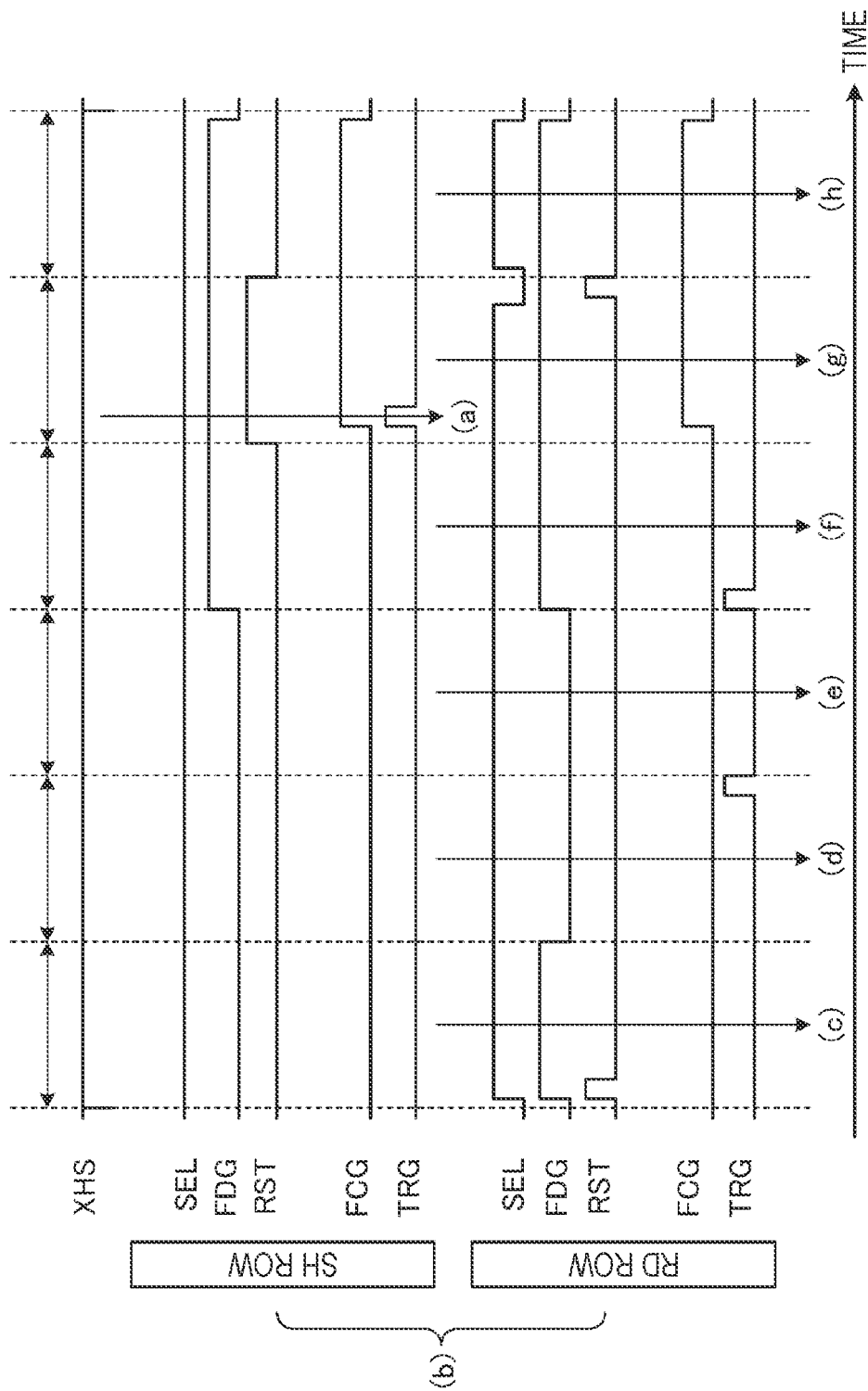
FIG. 5 is a processing timing chart of a first modification of the first embodiment.

FIG. 5 is a processing timing chart of the first modification of the first embodiment.

Figure 6A:
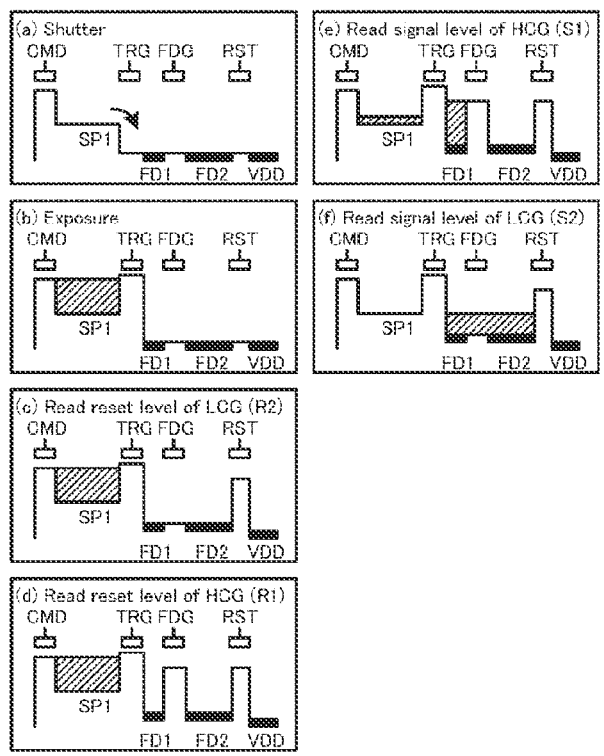
FIG. 6A is potential diagrams of the first modification of the first embodiment.
Figure 6B:
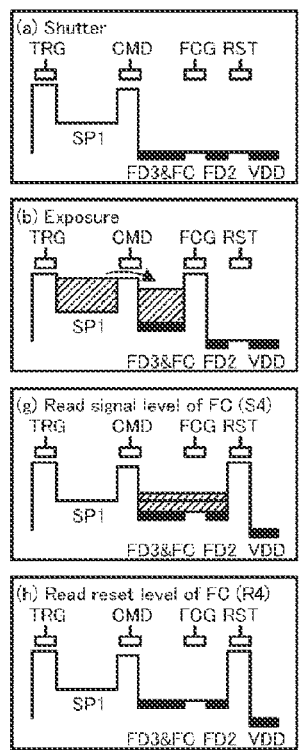
FIG. 6B is potential diagrams of the first modification of the first embodiment.

FIGS. 6A and 6B are potential diagrams of the first modification of the first embodiment.

In the exposure start operation, at the timing indicated by the arrow (a) in FIG. 5, the accumulation transistor 26 is set to the on state (conductive state) by the control signal FCG, further, the reset transistor 27 is set to the on state (conductive state) by the control signal RST, and the charge accumulated in the in-pixel capacitance 24 is set to the reset state, as illustrated in FIG. 6B(a), and in the on state (conductive state) of the conversion efficiency switching transistor 25 by the control signal FDG, the transfer transistor 23 is set to the on state (conductive state) by the control signal TRG, so that the charge accumulated in the photodiode 21 is also set to the reset state, as illustrated in FIG. 6A(a).

Then, as indicated by reference sign (b) in FIG. 5, exposure is performed between the row (SH row) where the exposure start operation is performed and the row (RD row) where the signal read operation is performed as illustrated in FIGS. 6A(b) and 6B(b).

Then, after a certain exposure time, the selection transistor 29 is set to the on state by the control signal SEL to start the signal read operation. The conversion efficiency switching transistor 25 is set to the on state (conductive state) by the control signal FDG, and at the timing indicated by the arrow (c) in FIG. 5, the reset level R2 at low conversion efficiency is acquired, as illustrated in FIG. 6A(c).

At this time, at the timing indicated by the arrow (c) in FIG. 5, the potentials of the floating diffusion region 22-1 (indicated by reference sign FD1 in FIG. 6A) and the floating diffusion region 22-2 (indicated by reference sign FD2 in FIGS. 6A and 6B) are coupled as illustrated in FIG. 6A(c).

Next, the conversion efficiency switching transistor 25 is set to the off state by the control signal FDG, and at the timing indicated by the arrow (d) in FIG. 5, the reset level R1 at high conversion efficiency is acquired, as illustrated in FIG. 6A(d).

Moreover, the transfer transistor 23 is set to the on state (conductive state) by the control signal TRG to transfer the charge accumulated in the photodiode 21 to the floating diffusion region 22-1.

Next, the transfer transistor 23 is set to the off state (non-conductive state) by the control signal TRG, and the signal level S1 at high conversion efficiency is acquired as illustrated in FIG. 6A(e) at the timing indicated by the arrow (e) in FIG. 5.

Next, at the timing indicated by the arrow (f) in FIG. 5, the conversion efficiency switching transistor 25 is set to the on state (conductive state) by the control signal FDG and at the same time, the transfer transistor 23 is set to the on state (conductive state) again by the control signal TRG, so that all the charges accumulated in the photodiode 21 are transferred to the floating diffusion region 22, and the signal level S2 at low conversion efficiency is read, as illustrated in FIG. 6A(f).

Here, in the case of high illuminance, the photocharge overflowing from the photodiode 21 is accumulated in the in-pixel capacitance 24. Therefore, at the timing indicated by the arrow (g) in FIG. 5, the in-pixel capacitance 24, the floating diffusion region 22-1, and the floating diffusion region 22-2 are potential-coupled by setting the accumulation transistor 26 in the on state (conductive state) by the control signal FCG, and the signal level S4 is read, as illustrated in FIG. 6B(g).

Next, in the state where the selection transistor 29 is set to the off state by the control signal SEL, the reset transistor 27 is set to the on state (conductive state) by the control signal RST, and the accumulated charge is set to the reset state.

Then, the reset transistor 27 is set to the off state (non-conductive state) by the control signal RST, and a reset level R4 is acquired as illustrated in FIG. 6B(h) at the timing indicated by the arrow (h) in FIG. 5.

Thereafter, for the difference between the signal level S1 at high conversion efficiency and the reset level R1 at high conversion efficiency, that is, for S1-R1, an image signal is generated by correlated double sampling (CDS).

Similarly, for the difference between the signal level S4 and the reset level R4, that is, for S4-R4, an image signal is generated by delta data sampling (DDS).

In contrast, for the difference between the signal level S2 at low conversion efficiency and the reset level R2 at low conversion efficiency, that is, for S2-R2, an image signal is generated by the correlated double sampling (CDS), but the signal level S2 at low conversion efficiency and the reset level R2 at low conversion efficiency are not continuously read, and thus the reset level R2 at low conversion efficiency needs to be temporarily held in a line memory or the like.

As a result, by combining three images corresponding to the image signals of S1-R1, S2-R2, and S4-R4, it is possible to configure an image having excellent low-illuminance characteristics, a high dynamic range, and no artifact of the object.

As described above, according to the first modification of the first embodiment, since the second accumulation transistor 31 functioning as the third charge transfer unit is provided between the photodiode 21 functioning as the first photoelectric conversion unit and the in-pixel capacitance 24 functioning as the charge accumulation unit, it becomes possible to reset the floating diffusion region 22-1 and the floating diffusion region 22-2 before reading the charge accumulated in the photodiode 21, and it is advantages in terms of charge transfer from the photodiode 21 to the floating diffusion region 22-1 and the floating diffusion region 22-2 and dark current white spots of the floating diffusion region 22-1 and the floating diffusion region 22-2, in addition to the effects of the first embodiment.

[1.2] Second Modification of First Embodiment

Figure 7:
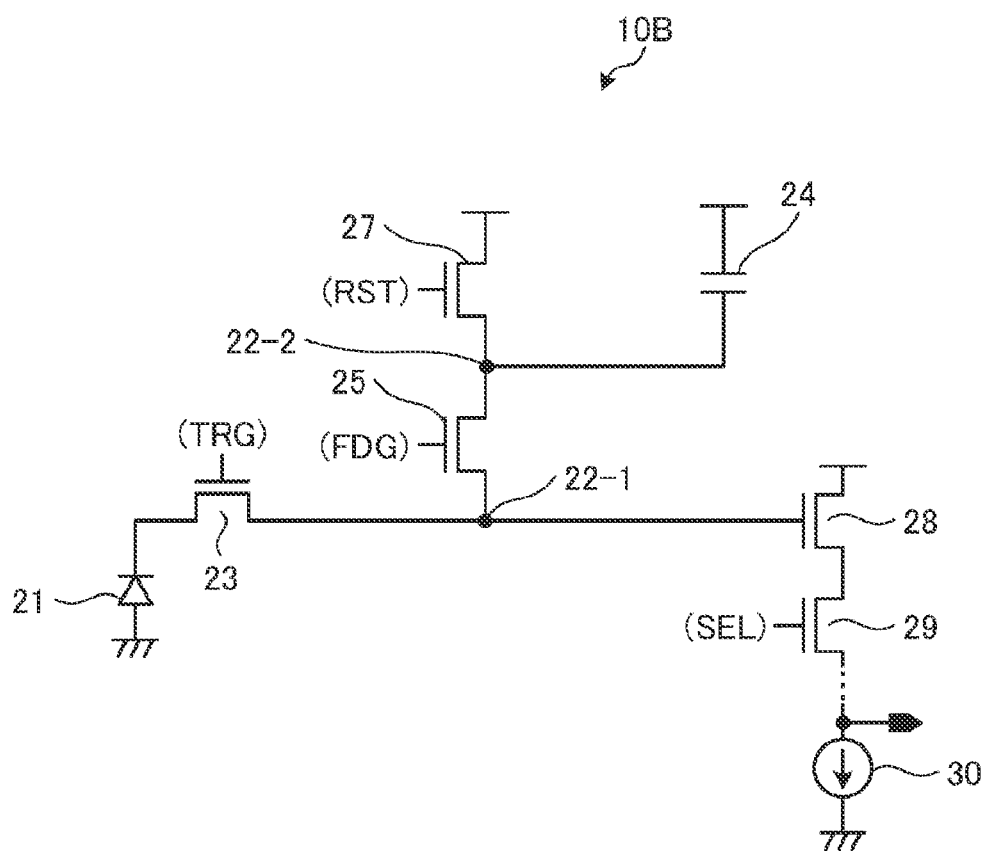
FIG. 7 is a schematic configuration diagram illustrating an example of a pixel constituting a solid-state imaging device according to a second modification of the first embodiment.

FIG. 7 is a schematic configuration diagram illustrating an example of a pixel constituting a solid-state imaging device according to a second modification of the first embodiment.

A pixel 10B of FIG. 7 is different from the pixel 10 of the first embodiment of FIG. 1 in that the in-pixel capacitance 24 is connected to a connection point between the conversion efficiency switching transistor 25 and the reset transistor 27 without providing the accumulation transistor 26.

Figure 8:
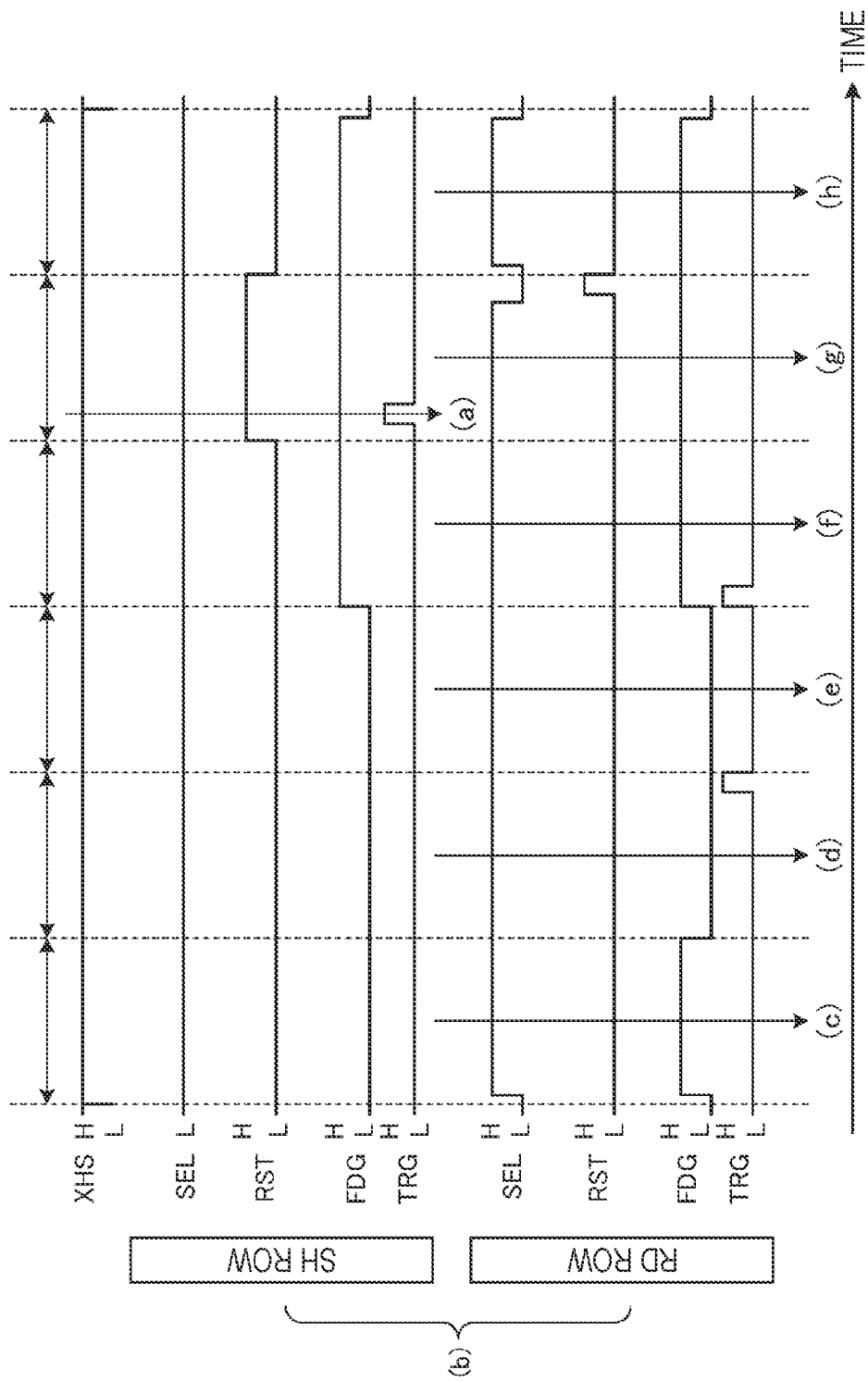
FIG. 8 is a processing timing chart of the second modification of the first embodiment.

FIG. 8 is a processing timing chart of the second modification of the first embodiment.

In FIG. 8, the upper stage is a processing timing chart of pixels corresponding to the row (SH row) where the exposure start operation is performed, and the lower stage is a processing timing chart of pixels corresponding to the row (RD row) where the read operation is performed.

Figure 9:
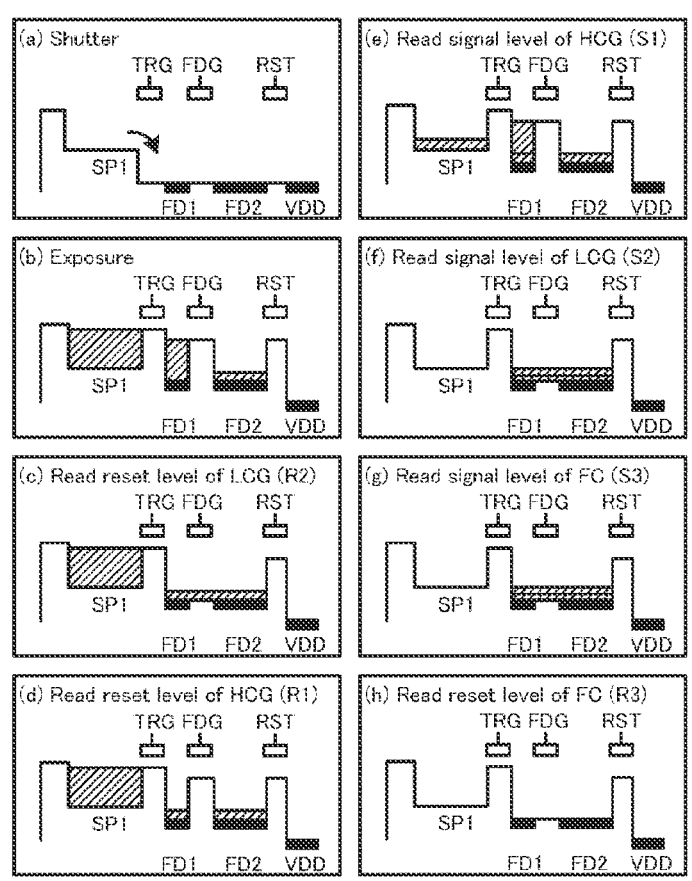
FIG. 9 is potential diagrams of the second modification of the first embodiment.

FIG. 9 is a potential diagram of the second modification of the first embodiment.

In the exposure start operation, at the timing indicated by the arrow (a) in FIG. 8, the reset transistor 27 is set to the on state (conductive state) by the control signal RST, the charge accumulated in the in-pixel capacitance 24 is set to the reset state, the conversion efficiency switching transistor 25 is set to the on state (conductive state) by the control signal FDG, and the transfer transistor 23 is set to the on state (conductive state) by the control signal TRG, so that the charge accumulated in the photodiode 21 is also set to the reset state, as illustrated in FIG. 9(a).

Then, as indicated by reference sign (b) in FIG. 8, exposure is performed between the row (SH row) where the exposure start operation is performed and the row (RD row) where the signal read operation is performed as illustrated in FIG. 9(b).

Then, after a certain exposure time, the selection transistor 29 is set to the on state by the control signal SEL to start the signal read operation. The conversion efficiency switching transistor 25 is set to the on state (conductive state) by the control signal FDG, and at the timing indicated by the arrow (c) in FIG. 8, the reset level R2 at low conversion efficiency is acquired, as illustrated in FIG. 9(c).

At this time, at the timing indicated by the arrow (c) in FIG. 8, the potentials of the floating diffusion region 22-1 (indicated by reference sign FD1 in FIG. 9) and the floating diffusion region 22-2 (indicated by reference sign FD2 in FIG. 9) are coupled as illustrated in FIG. 9(c).

In this case, the potentials of the floating diffusion region 22-1 (indicated by reference sign FD1 in FIG. 9) and the floating diffusion region 22-2 (indicated by reference sign FD2 in FIG. 9) are supplied as a gate voltage of the amplification transistor 28, and the gate voltage is supplied as a pixel signal to the subsequent stage (for example, an AD converter) via the selection transistor 29 and a vertical signal line.

Next, at the timing indicated by the arrow (d) in FIG. 8, the conversion efficiency switching transistor 25 is set to the off state (non-conductive state) by the control signal FDG, and the reset level R1 at high conversion efficiency is acquired, as illustrated in FIG. 9(d).

Next, at the timing indicated by the arrow (e) in FIG. 8, the signal level S1 at high conversion efficiency is acquired as illustrated in FIG. 9(e).

Next, at the timing indicated by the arrow (f) in FIG. 8, the conversion efficiency switching transistor 25 is set to the on state (conductive state) by the control signal FDG and at the same time, the transfer transistor 23 is set to the on state (conductive state) again by the control signal TRG, so that all the charges accumulated in the photodiode 21 are transferred to the floating diffusion region 22, then, the transfer transistor 23 is set to the off state (non-conductive state) by the control signal TRG, and then the signal level S2 at low conversion efficiency is read, as illustrated in FIG. 9(f).

Here, in the case of high illuminance, since the photocharge overflowing from the photodiode 21 is accumulated in the in-pixel capacitance 24, a signal level S3 is read as illustrated in FIG. 9 (g) at the timing indicated by the arrow (g) in FIG. 8.

Next, in the state where the selection transistor 29 is set to the off state by the control signal SEL, the reset transistor 27 is set to the on state (conductive state) by the control signal RST, and the accumulated charge is set to the reset state.

Then, the reset transistor 27 is set to the off state (non-conductive state) by the control signal RST, and a reset level R3 is acquired as illustrated in FIG. 9(h) at the timing indicated by the arrow (h) in FIG. 8.

For the difference between the signal level S1 at high conversion efficiency and the reset level R1 at high conversion efficiency, that is, for S1-R1, an image signal is generated by correlated double sampling (CDS).

Similarly, for the difference between the signal level S3 and the reset level R3, that is, for S3-R3, an image signal is generated by delta data sampling (DDS).

In contrast, for the difference between the signal level S2 at low conversion efficiency and the reset level R2 at low conversion efficiency, that is, for S2-R2, an image signal is generated by the correlated double sampling (CDS), but the signal level S2 at low conversion efficiency and the reset level R2 at low conversion efficiency are not continuously read, and thus the reset level R2 at low conversion efficiency needs to be temporarily held in a line memory or the like.

As a result, according to the second modification of the first embodiment, by combining three images corresponding to the image signals of S1-R1, S2-R2, and S3-R3, it is possible to configure an image having excellent low-illuminance characteristics, a high dynamic range, and no artifact of the object.

As described above, according to the second modification of the first embodiment, since the in-pixel capacitance 24 is connected to the connection point between the conversion efficiency switching transistor 25 and the reset transistor 27 without providing the accumulation transistor 26, the pixel size can be reduced in addition to the effects of the first embodiment.

[2] Second Embodiment

Figure 10:
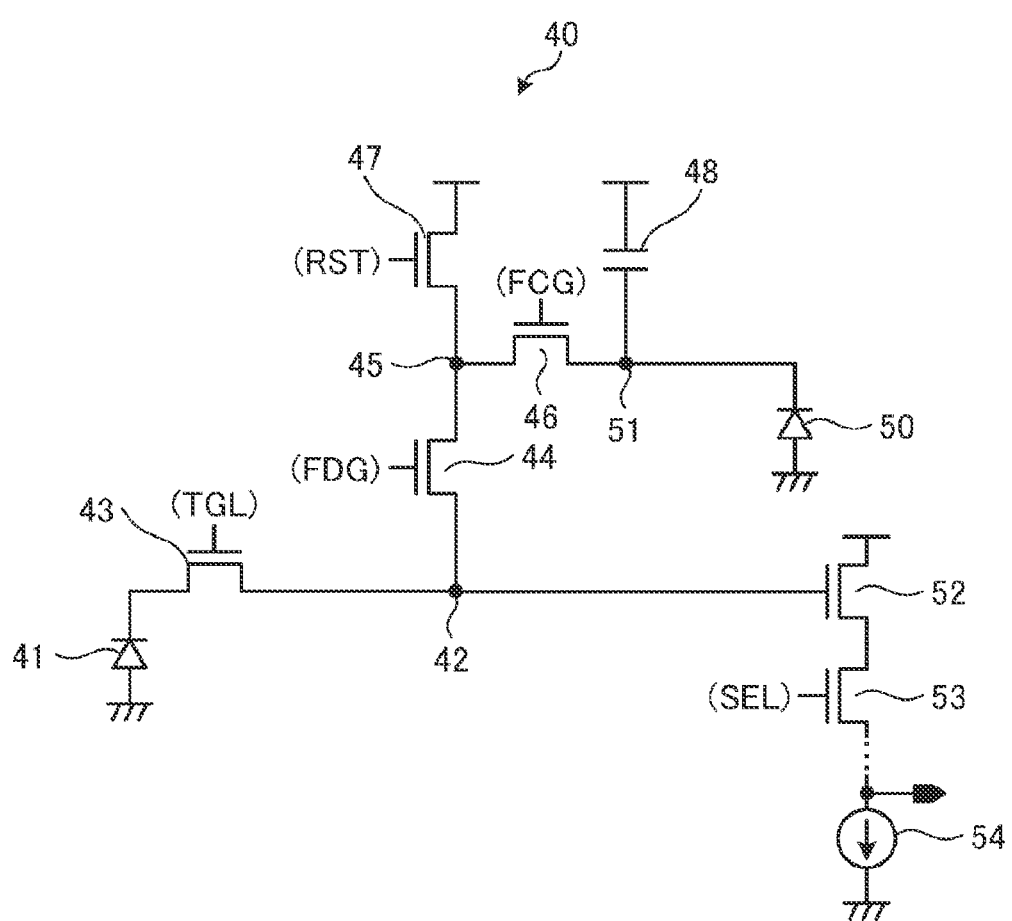
FIG. 10 is a schematic configuration diagram illustrating an example of a pixel constituting a solid-state imaging device according to a second embodiment.

FIG. 10 is a schematic configuration diagram illustrating an example of a pixel constituting a solid-state imaging device according to a second embodiment.

A plurality of (for example, N rows x M columns. N and M are integers of 2 or larger) pixels 40 according to the second embodiment is provided to constitute a pixel array unit in the solid-state imaging device, similarly to the first embodiment. Then, the pixel 10 photoelectrically converts incident light and generates a pixel signal corresponding to the amount of received incident light.

For example, as illustrated in FIG. 10, the pixel 40 includes a high-sensitivity photodiode 41 as a first photoelectric conversion unit, a first floating diffusion region 42 as a first charge modulation unit, a transfer transistor 43 as a charge transfer unit, a conversion efficiency switching transistor 44 as a modulation switching unit, a second floating diffusion region 45 as a second charge modulation unit, an accumulation transistor 46 as a capacitance connection unit, a reset transistor 47, an in-pixel capacitance 48 as a charge accumulation unit, a low-sensitivity photodiode 50 as a second photoelectric conversion unit, a third floating diffusion region 51 as a third charge modulation unit, an amplification transistor 52, and a selection transistor 53.

In the above configuration, the high-sensitivity photodiode 41 generates a charge corresponding to the amount of received incident light with high sensitivity.

The first floating diffusion region 42 functions as the first charge modulation unit and simultaneously stores a charge overflowing from the high-sensitivity photodiode 41.

The transfer transistor 43 functions as the charge transfer unit, and transfers a photocharge accumulated in the high-sensitivity photodiode 41 to the first floating diffusion region 42.

The conversion efficiency switching transistor 44 functions as the modulation switching unit, and switches conversion efficiency by modulating the photocharge accumulated in the high-sensitivity photodiode 41 to a voltage signal in a state of only the first floating diffusion region 42, a state of coupling potentials of the first floating diffusion region 42 and the second floating diffusion region 45, or a state of coupling potentials of the first floating diffusion region 42, the second floating diffusion region 45, and the third floating diffusion region 51.

The first floating diffusion region 42 and the second floating diffusion region 45 function as the first charge modulation unit and the second charge modulation unit, and at the same time, store the charge overflowing from the high-sensitivity photodiode 41.

The accumulation transistor 46 functions as the capacitance connection unit, and couples or divides the potentials of the second floating diffusion region 45 and the third floating diffusion region 51.

The reset transistor 47 resets the accumulated charge and shifts to an initial state.

The low-sensitivity photodiode 50 functions as the second photoelectric conversion unit and generates the charge according to the amount of received incident light.

The third floating diffusion region 51 functions as the third charge modulation unit and at the same time, functions as the charge accumulation unit to which the in-pixel capacitance 48 is connected and which stores the charge generated by photoelectric conversion in the low-sensitivity photodiode 50.

The amplification transistor 52 amplifies a voltage signal obtained by modulating the charge and outputs the amplified voltage signal as a pixel signal.

The selection transistor 53 has a low potential side connected to a constant current source 54, and outputs the pixel signal output from the amplification transistor 52 to a subsequent stage at the time of conduction.

Figure 11:
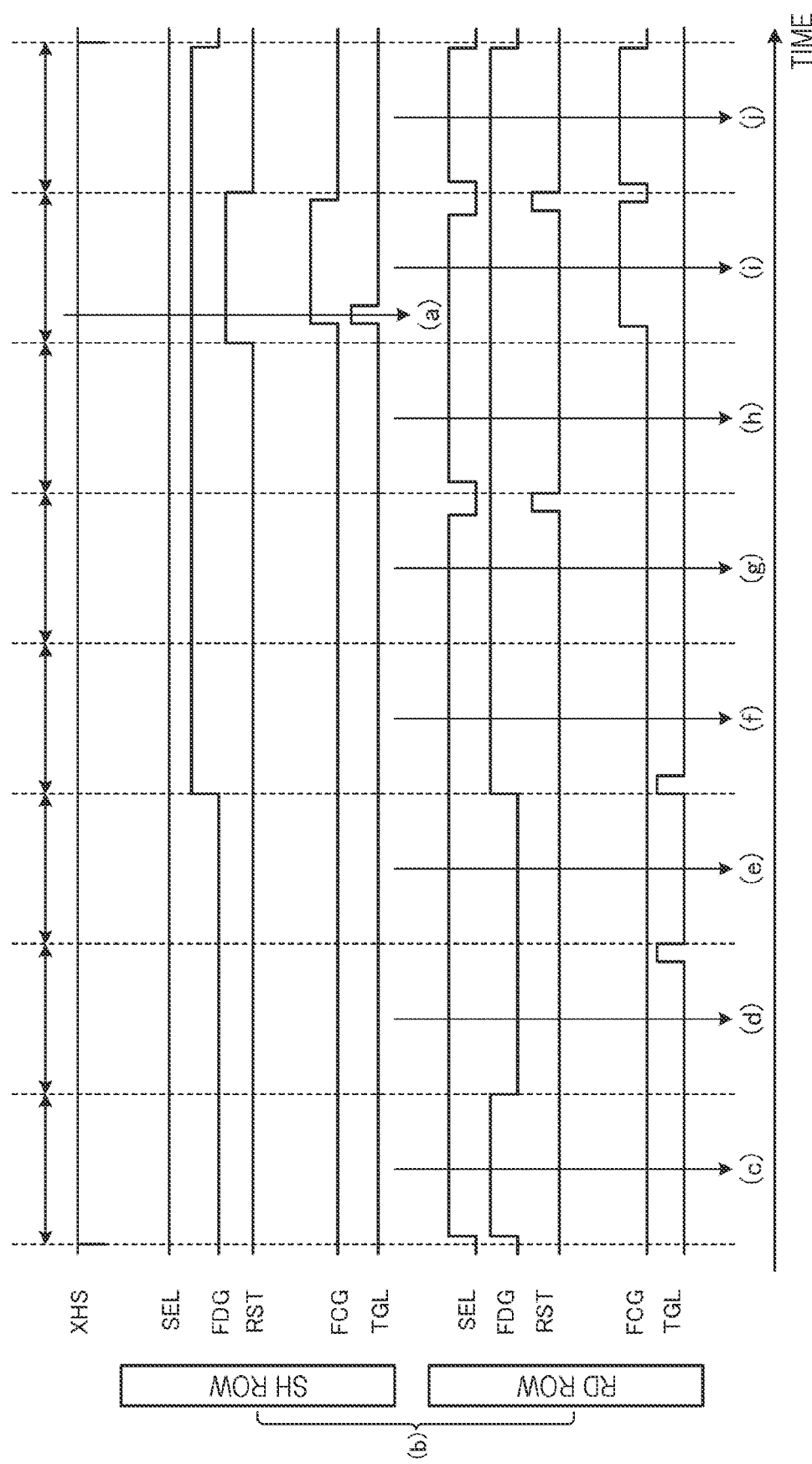
FIG. 11 is a processing timing chart of the second embodiment.

FIG. 11 is a processing timing chart of the second embodiment.

Figure 12A:
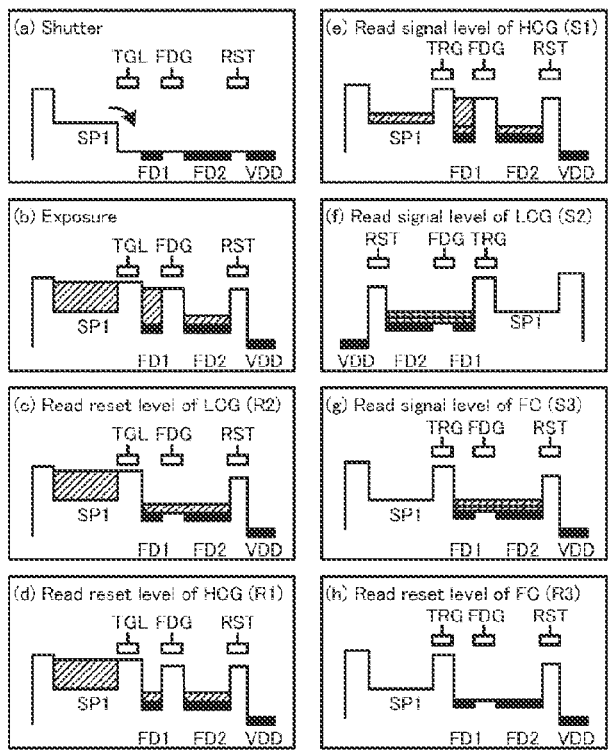
FIG. 12A is potential diagrams according to the second embodiment.
Figure 12B:
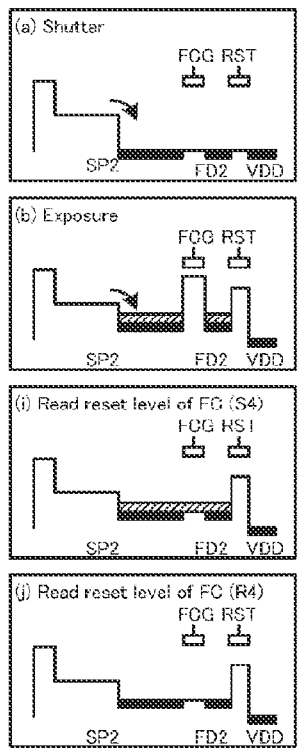
FIG. 12B is potential diagrams according to the second embodiment.

FIGS. 12A and 12B are potential diagrams according to the second embodiment.

In an exposure start operation, at the timing indicated by the arrow (a) in FIG. 11, the reset transistor 47 is set to an on state (conductive state) by a control signal RST and the third floating diffusion region 51 is set to a reset state while the accumulation transistor 46 is in the on-state (conductive state) by a control signal FCG, as illustrated in FIG. 12B(a), and the conversion efficiency switching transistor 44 is set to the on state (conductive state) by a control signal FDG and the transfer transistor 43 is set to the on state (conductive state) by a control signal TGL, as illustrated in FIG. 12A(a), so that the high-sensitivity photodiode 41 is set to the reset state.

Then, as indicated by reference sign (b) in FIG. 11, exposure is performed between a row (SH row) where the exposure start operation is performed and a row (RD row) where a signal read operation is performed as illustrated in FIGS. 12A(b) and 12B(b).

Then, after a certain exposure time, the selection transistor 53 is set to the on state by a control signal SEL to start the signal read operation. The conversion efficiency switching transistor 44 is set to the on state (conductive state) by the control signal FDG, and at the timing indicated by the arrow (c) in FIG. 11, a reset level R2 at low conversion efficiency is acquired, as illustrated in FIG. 12A(c).

At this time, at the timing indicated by the arrow (c) in FIG. 11, the potentials of the first floating diffusion region 42 (indicated by reference sign FD1 in FIG. 12A) and the second floating diffusion region 45 (indicated by reference sign FD2 in FIGS. 12A and 12B) are coupled as illustrated in FIG. 12A(c).

Next, at the timing indicated by the arrow (d) in FIG. 11, the conversion efficiency switching transistor 44 is set to an off state (non-conductive state) by the control signal FDG, and a reset level R1 at high conversion efficiency is acquired, as illustrated in FIG. 12A(d).

Next, the transfer transistor 43 is set to the on state (conductive state) by the control signal TGL to transfer the charge accumulated in the high-sensitivity photodiode 41 to the first floating diffusion region 42, and is then set to the off state (non-conductive state) by the control signal TGL.

Next, at the timing indicated by the arrow (e) in FIG. 11, a signal level S1 at high conversion efficiency is acquired as illustrated in FIG. 12A(e).

Next, at the timing indicated by the arrow (f) in FIG. 11, the conversion efficiency switching transistor 44 is set to the on state (conductive state) by the control signal FDG, and at the same time, the transfer transistor 43 is set to the on state (conductive state) again by the control signal TGL, so that all the charges accumulated in the high-sensitivity photodiode 41 are transferred to the first floating diffusion region 42 and the second floating diffusion region 45, then, the transfer transistor 43 is set to the off state (non-conductive state) by the control signal TGL, and then, a signal level S2 at low conversion efficiency is read, as illustrated in FIG. 12A(f).

Next, a signal level S3 is read while the potentials of the first floating diffusion region 42 and the second floating diffusion region 45 are kept coupled.

Next, the selection transistor 53 is set to the off state by the control signal SEL, the reset transistor 47 is set to the on state (conductive state) by the control signal RST, and the charges accumulated in the first floating diffusion region 42 and the second floating diffusion region 45 are set to the reset state.

Then, the reset transistor 47 is set to the off state (non-conductive state) by the control signal RST, and a reset level R3 is read as illustrated in FIG. 12A(h) at the timing indicated by the arrow (h) in FIG. 11.

Then, at the timing indicated by the arrow (i) in FIG. 11, the accumulation transistor 46 is set to the on state (conductive state) by the control signal FCG, the potentials of the second floating diffusion region 45 and the third floating diffusion region 51 are combined, and a signal level S4 is read, as illustrated in FIG. 12B(i).

Next, in a state where the selection transistor 53 is set to the off state by the control signal SEL, the reset transistor 47 is set to the on state (conductive state) by the control signal RST, and the accumulated charge is set to the reset state.

Next, at the timing indicated by the arrow (j) in FIG. 11, the selection transistor 53 is set to the on state (conductive state) again by the control signal SEL, and a reset level R4 is acquired, as illustrated in FIG. 12B(j).

Thereafter, for a difference between the signal level S1 at high conversion efficiency and the reset level R1 at high conversion efficiency corresponding to the high-sensitivity photodiode 41, that is, for S1-R1 an image signal is generated by correlated double sampling (CDS).

In contrast, for a difference between the signal level S2 at low conversion efficiency and the reset level R2 at low conversion efficiency corresponding to the high-sensitivity photodiode 41, that is, for S2-R2, an image signal is generated by the correlated double sampling (CDS), but the signal level S2 at low conversion efficiency and the reset level R2 at low conversion efficiency are not continuously read, and thus the reset level R2 at low conversion efficiency needs to be temporarily held in a line memory or the like.

Similarly, for a difference between the signal level S3 and the reset level R3 corresponding to the high-sensitivity photodiode 41, that is, for S3-R3, an image signal is generated by delta data sampling (DDS).

Thereafter, for a difference between the signal level S4 and the reset level R4 of the low-sensitivity photodiode 50, that is, for S4-R4, an image signal is generated by delta data sampling (DDS).

As a result, by combining four images corresponding to the pixel signals corresponding to S1-R1, S2-R2, S3-R3, and S4-R4, it is possible to configure an image having excellent low-illuminance characteristics, a high dynamic range, and no artifact of the object.

As described above, according to the second embodiment, in the state of the first floating diffusion region 42 alone functioning as the first charge modulation unit and in the state where the first floating diffusion region 42 functioning as the first charge modulation unit and the second floating diffusion region 45 functioning as the second charge modulation unit are coupled by the conversion efficiency switching transistor 44 functioning as the modulation switching unit, the charge accumulated in the high-sensitivity photodiode 41 functioning as the first photoelectric conversion unit is modulated into the voltage signal and the voltage signals having different conversion efficiencies are continuously read. Moreover, the charge accumulated in the high-sensitivity photodiode 41 functioning as the first photoelectric conversion unit and the charge overflowing from the high-sensitivity photodiode 41 functioning as the first photoelectric conversion unit during the accumulation period are modulated into the voltage signal and the voltage signal is read in the capacitance in which the first floating diffusion region 42 functioning as the first charge modulation unit and the second floating diffusion region 45 functioning as the second charge modulation unit are coupled. Moreover, the charge generated in the low-sensitivity photodiode 50 functioning as the second photoelectric conversion unit and accumulated in the in-pixel capacitance 48 functioning as the charge accumulation unit is modulated into the voltage signal and the voltage signal is read in the capacitance in which the first floating diffusion region 42 functioning as the first charge modulation unit, the second floating diffusion region 45 functioning as the second charge modulation unit, and the in-pixel capacitance 48 functioning as the charge accumulation unit are coupled. Therefore, excellent low-illuminance characteristics and an expanded high dynamic range can be obtained.

[3] Modification of Embodiments

Figure 13:
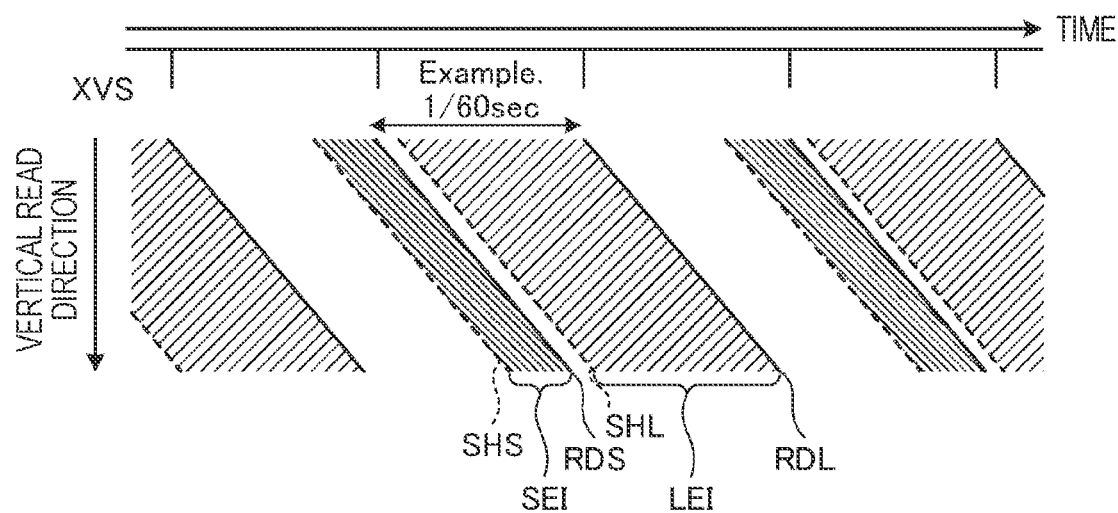
FIG. 13 is an explanatory diagram of processing timing of short-term exposure time accumulation and long-term exposure time accumulation in the embodiment.

FIG. 13 is an explanatory diagram of processing timing of a short-term exposure operation and a long-term exposure operation applicable to each of the above-described embodiments and modifications.

The present processing timing can be applied to each of the above-described embodiments and modifications.

In FIG. 13, a short-term exposure operation SEI and a long-term exposure operation LEI are alternately performed.

Then, shutter timing SHS for short-term exposure time is set immediately before the short-term exposure operation SEI, and signal read timing RDS for short-term exposure time is provided immediately after the short-term exposure operation SEI.

By providing the short-term exposure operation SEI as described above, the dynamic range can be further expanded.

Similarly, shutter timing SHL for long-term exposure time is set immediately before the long-term exposure operation LEI, and signal read timing RDL for long-term exposure time is provided immediately after the long-term exposure operation LEI.

Figure 14:
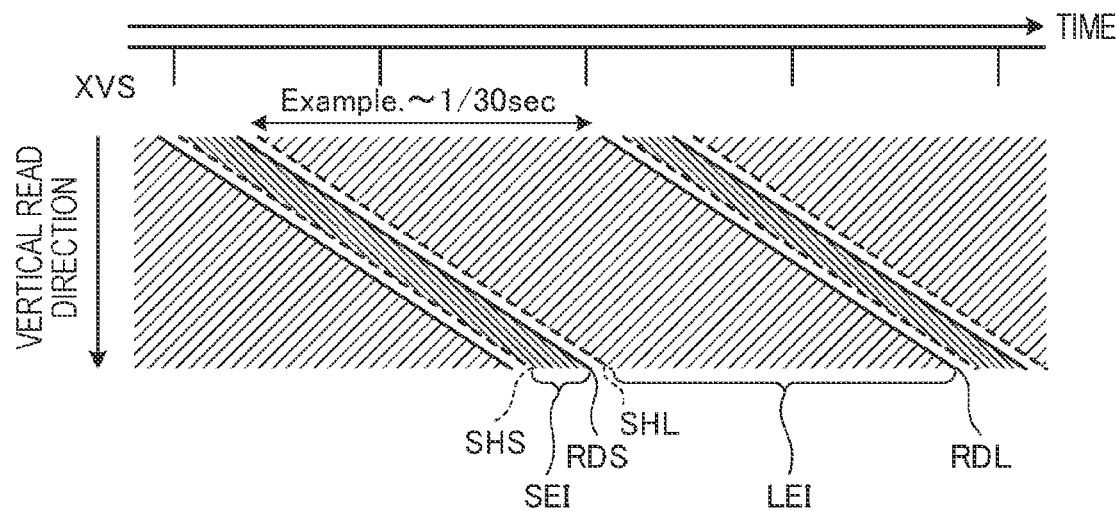
FIG. 14 is an explanatory diagram of a modification of the processing timing of the short-term exposure time accumulation and the long-term exposure time accumulation in the embodiment.

FIG. 14 is an explanatory diagram of a modification of processing timing of a short-term exposure operation and a long-term exposure operation.

The present processing timing can also be applied to each of the above-described embodiments and modifications.

By providing a line memory for the short-term exposure operation, it is possible to reduce the artifact of the moving object without providing an interval between the short-term exposure operation SEI and the long-term exposure operation LEI, as illustrated in FIG. 4.

Figure 15:
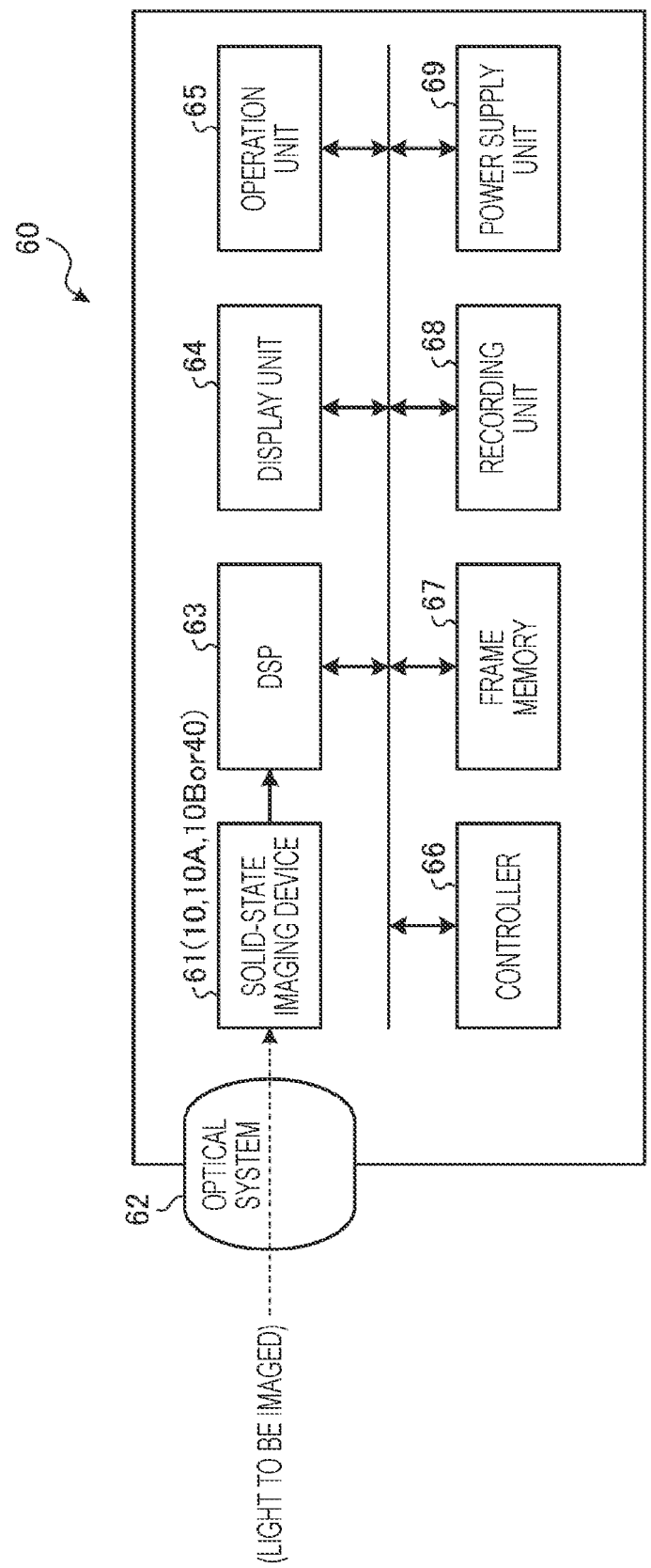
FIG. 15 is a diagram for describing a configuration example of an imaging device as an electronic device.

FIG. 15 is a diagram for describing a configuration example of an imaging device as an electronic device.

An imaging device 60 includes a solid-state imaging device 61 including the pixels 10, 10A, 10B, or 40 of each of the above-described embodiments, an optical system 62 including a lens group and the like, a digital signal processor (DSP) 63 as a signal processing circuit that processes imaging data, a display unit 64 that includes a liquid crystal display, an organic EL display, or the like and displays a captured image and various types of information, an operation unit 65 that a user performs various operations such as an imaging instruction and data setting, a controller 66 that controls the entire imaging device 60, a frame memory 67 that stores image data, a recording unit 68 that records the imaging data on a recording medium such as a hard disk or a memory card (not illustrated), and a power supply unit 69 that supplies power to the entire imaging device 60.

In the above configuration, the DSP 63, the display unit 64, the operation unit 65, the controller 66, the frame memory 67, the recording unit 68, and the power supply unit 69 are connected to each other via a bus line.

According to the above configuration, since the above-described solid-state imaging device 61 including the pixels 10, 10A, 10B, or 40 is used as an imaging element, it is possible to capture an image having excellent low illuminance characteristics, a high dynamic range, and few artifacts of the object.

Examples of an actual mode of the imaging device 60 include camera modules for mobile terminal devices such as a video camera, a digital still camera, and a smartphone.

Figure 16:
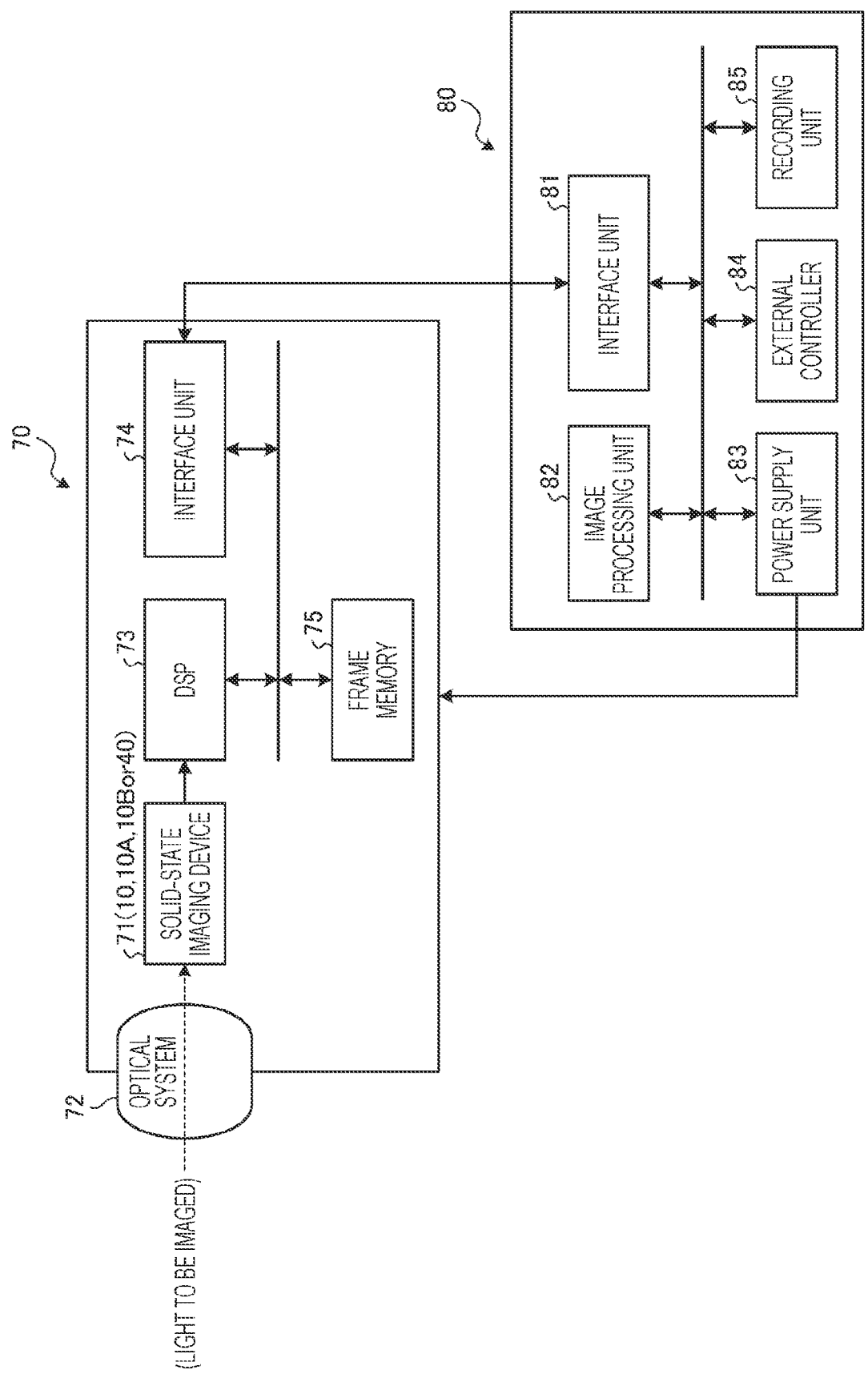
FIG. 16 is a diagram for describing a configuration example of an imaging device as another electronic device.

FIG. 16 is a diagram for describing a configuration example of an imaging device as another electronic device.

An imaging device 70 includes a solid-state imaging device 71 including the pixels 10, 10A, 10B, or 40 of each of the above-described embodiments, an optical system 72 including a lens group and the like, a DSP 73 as a signal processing circuit that processes imaging data, an interface unit 74 that performs an interface operation with an external device 80, and a frame memory 75 that stores image data.

The imaging device 70 of the present mode performs imaging under the control of the external device 80 by power supplied from the external device 80, and can be applied as, for example, a camera module or the like that captures a monitoring image around a vehicle by receiving power supply from the vehicle side under the control of an in-vehicle ECU or the like as the external device 80.

In this case, the external device 80 includes an interface unit 81 that performs an interface operation with the imaging device 70, an image processing unit 82 that applies image processing for obtaining desired image data (for example, a surrounding obstacle image, a sign recognition image, and the like) to the imaging data acquired via the interface unit 81, a power supply unit 83 that supplies operation power to the imaging device 70 and the external device 80, an external controller 84 that controls the imaging device 70 via the interface unit 81, and a recording unit 85 that records the imaging data on a recording medium such as a hard disk and a memory card (not illustrated).

Examples of the application of such an imaging device 70 include an on-vehicle sensor that is provided on a peripheral surface (front surface, side surface, or rear surface) of an automobile, in a vehicle interior, or the like, for ensuring safe driving such as automatic stop, recognition of a state of a driver, or the like, and captures a periphery of the vehicle or an inside of the vehicle, a monitoring camera for remotely monitoring traveling vehicles and roads, and a distance measuring device.

Furthermore, the imaging device can be used as an imaging device for detecting and controlling the position, action (gesture) and the like of the user, having a main body of a home appliance (an air conditioner, a refrigerator, a microwave oven, or the like) as the external device 80.

Moreover, the imaging device can also be used for person authentication, skin capture, or the like.

Note that embodiments of the present technology are not limited to the above-described embodiments, and various modifications can be made without departing from the gist of the present technology.

Moreover, the present technology may be configured as follows.

(1)

A solid-state imaging device including:

a photoelectric conversion unit;

a charge transfer unit configured to transfer a charge accumulated in the photoelectric conversion unit;

a first charge modulation unit to which the charge is transferred from the photoelectric conversion unit by the charge transfer unit;

a second charge modulation unit;

a modulation switching unit configured to couple or divide the first charge modulation unit and the second charge modulation unit;

a charge accumulation unit configured to accumulate a charge overflowing from the photoelectric conversion unit during an accumulation period; and a capacitance connection unit configured to couple or divide the second charge modulation unit and the charge accumulation unit, in which, in a state of the first charge modulation unit alone and a state where the first charge modulation unit and the second charge modulation unit are coupled by the modulation switching unit, the charge accumulated in the photoelectric conversion unit is modulated into a voltage signal, and voltage signals having different conversion efficiencies are continuously read, and further, the charge accumulated in the photoelectric conversion unit and the charge overflowing from the photoelectric conversion unit during the accumulation period are modulated into a voltage signal and the voltage signal is read in a capacitance obtained by coupling the first charge modulation unit, the second charge modulation unit, and the charge accumulation unit by the modulation switching unit and the capacitance connection unit.

(2)

A solid-state imaging device including:

a first photoelectric conversion unit;

a charge transfer unit configured to transfer a charge accumulated in the first photoelectric conversion unit;

a first charge modulation unit to which the charge is transferred from the first photoelectric conversion unit by the charge transfer unit;

a second charge modulation unit;

a modulation switching unit configured to couple or divide the first charge modulation unit and the second charge modulation unit;

a second photoelectric conversion unit;

a charge accumulation unit directly connected to the second photoelectric conversion unit and configured to accumulate a charge generated in the second photoelectric conversion unit during an accumulation period; and a capacitance connection unit configured to couple or divide the second charge modulation unit and the charge accumulation unit, in which, in a state of the first charge modulation unit alone and a state where the first charge modulation unit and the second charge modulation unit are coupled by the modulation switching unit, the charge accumulated in the first photoelectric conversion unit is modulated into a voltage signal, and voltage signals having different conversion efficiencies are continuously read, the charge accumulated in the first photoelectric conversion unit and the charge overflowing from the first photoelectric conversion unit during the accumulation period are modulated into a voltage signal and the voltage signal is read in a capacitance obtained by coupling the first charge modulation unit and the second charge modulation unit, and further, the charge generated in the second photoelectric conversion unit and accumulated in the charge accumulation unit is modulated into a voltage signal and the voltage signal is read in a capacitance obtained by coupling the first charge modulation unit, the second charge modulation unit, and the charge accumulation unit.

(3)

The solid-state imaging device according to (2), further including:

a second charge transfer unit provided between the second photoelectric conversion unit and the charge accumulation unit and configured to transfer the charge accumulated in the second photoelectric conversion unit to the charge accumulation unit.

(4)

The solid-state imaging device according to any one of (1) to (3), further including:

a charge resetting unit provided between the second charge modulation unit and a power supply, and configured to reset the charges in the first charge modulation unit, the second charge modulation unit, and the charge accumulation unit after the charge accumulated in the photoelectric conversion unit and the charge overflowing from the photoelectric conversion unit during the accumulation period are read.

(5)

The solid-state imaging device according to (1), further including:

a third charge transfer unit provided between the photoelectric conversion unit and the charge accumulation unit and configured to transfer the charge overflowing from the photoelectric conversion unit during the accumulation period to the charge accumulation unit.

(6)

The solid-state imaging device according to (5), further including:

a charge resetting unit provided between the second charge modulation unit and a power supply and configured to reset charges of the first charge modulation unit and the second charge modulation unit before the charge accumulated in the photoelectric conversion unit is read.

(7)

A method of driving a solid-state imaging device including a photoelectric conversion unit, a charge transfer unit configured to transfer a charge accumulated in the photoelectric conversion unit, a first charge modulation unit to which the charge is transferred from the photoelectric conversion unit by the charge transfer unit, a second charge modulation unit, a charge accumulation unit configured to accumulate a charge overflowing from the photoelectric conversion unit during an accumulation period, a modulation switching unit configured to couple or divide the first charge modulation unit and the second charge modulation unit, and a capacitance connection unit configured to couple or divide the second charge modulation unit and the charge accumulation unit, the method including:

modulating the charge accumulated in the photoelectric conversion unit and continuously reading voltage signals having different conversion efficiencies in a state of the first charge modulation unit alone and a state where the first charge modulation unit and the second charge modulation unit are coupled by the modulation switching unit; and further modulating the charge accumulated in the photoelectric conversion unit and the charge overflowing from the photoelectric conversion unit during the accumulation period into a voltage signal and reading the voltage signal in a capacitance obtained by coupling the first charge modulation unit, the second charge modulation unit, and the charge accumulation unit by the modulation switching unit and the capacitance connection unit.

(8)

An electronic device provided with a solid-state imaging device including a photoelectric conversion unit, a charge transfer unit configured to transfer a charge accumulated in the photoelectric conversion unit, a first charge modulation unit to which the charge is transferred from the photoelectric conversion unit by the charge transfer unit, a second charge modulation unit, a charge accumulation unit configured to accumulate a charge overflowing from the photoelectric conversion unit during an accumulation period, a modulation switching unit configured to couple or divide the first charge modulation unit and the second charge modulation unit, and a capacitance connection unit configured to couple or divide the second charge modulation unit and the charge accumulation unit, in which, in a state of the first charge modulation unit alone and a state where the first charge modulation unit and the second charge modulation unit are coupled by the modulation switching unit, the charge accumulated in the photoelectric conversion unit is modulated into a voltage signal, and voltage signals having different conversion efficiencies are continuously read, and further, the charge accumulated in the photoelectric conversion unit and the charge overflowing from the photoelectric conversion unit during the accumulation period are modulated into a voltage signal and the voltage signal is read in a capacitance obtained by coupling the first charge modulation unit, the second charge modulation unit, and the charge accumulation unit by the modulation switching unit and the capacitance connection unit.

REFERENCE SIGNS LIST 10, 10A, 10B, 40 Pixel
21 Photodiode (photoelectric conversion unit)
22 Floating diffusion region (charge accumulation unit)
23, 43 Transfer transistor (transfer unit)
24, 48 In-pixel capacitance
25, 44 Conversion efficiency switching transistor (conversion efficiency switching unit)
26, 46 Accumulation transistor
27, 47 Reset transistor (reset unit)
28, 52 Amplification transistor
29, 53 Selection transistor
30, 54 Constant current source
41 High-sensitivity photodiode (first photoelectric conversion unit)
42 First floating diffusion region (charge accumulation unit)
45 Second floating diffusion region (charge accumulation unit)
50 Low-sensitivity photodiode (second photoelectric conversion unit)
51 Third floating diffusion region (charge accumulation unit)

The invention claimed is:

1. A solid-state imaging device, comprising:
a photoelectric conversion unit;
a charge transfer unit configured to transfer a charge accumulated in the photoelectric conversion unit;
a first charge modulation unit to which the charge is transferred from the photoelectric conversion unit by the charge transfer unit;
a second charge modulation unit;
a modulation switching unit configured to couple or divide the first charge modulation unit and the second charge modulation unit;
a charge accumulation unit configured to accumulate a charge overflowing from the photoelectric conversion unit during an accumulation period; and
a capacitance connection unit configured to couple or divide the second charge modulation unit and the charge accumulation unit,
wherein,
in a state of the first charge modulation unit alone and a state where the first charge modulation unit and the second charge modulation unit are coupled by the modulation switching unit, the charge accumulated in the photoelectric conversion unit is modulated into a voltage signal, and voltage signals having different conversion efficiencies are continuously read, and further, the charge accumulated in the photoelectric conversion unit and the charge overflowing from the photoelectric conversion unit during the accumulation period are modulated into a voltage signal and the voltage signal is read in a capacitance obtained by coupling the first charge modulation unit, the second charge modulation unit, and the charge accumulation unit by the modulation switching unit and the capacitance connection unit.

2. The solid-state imaging device according to claim 1, further comprising:
a charge resetting unit provided between the second charge modulation unit and a power supply, and configured to reset charges in the first charge modulation unit, the second charge modulation unit, and the charge accumulation unit after the charge accumulated in the photoelectric conversion unit and the charge overflowing from the photoelectric conversion unit during the accumulation period are read.

3. The solid-state imaging device according to claim 1, further comprising:
a third charge transfer unit provided between the photoelectric conversion unit and the charge accumulation unit and configured to transfer the charge overflowing from the photoelectric conversion unit during the accumulation period to the charge accumulation unit.

4. The solid-state imaging device according to claim 3, further comprising:
a charge resetting unit provided between the second charge modulation unit and a power supply and configured to reset the charges in the first charge modulation unit and the second charge modulation unit before the charge accumulated in the photoelectric conversion unit is read.

5. A solid-state imaging device, comprising:
a first photoelectric conversion unit;
a charge transfer unit configured to transfer a charge accumulated in the first photoelectric conversion unit;
a first charge modulation unit to which the charge is transferred from the first photoelectric conversion unit by the charge transfer unit;
a second charge modulation unit;
a modulation switching unit configured to couple or divide the first charge modulation unit and the second charge modulation unit;
a second photoelectric conversion unit;
a charge accumulation unit directly connected to the second photoelectric conversion unit and configured to accumulate a charge generated in the second photoelectric conversion unit during an accumulation period; and
a capacitance connection unit configured to couple or divide the second charge modulation unit and the charge accumulation unit,
wherein,
in a state of the first charge modulation unit alone and a state where the first charge modulation unit and the second charge modulation unit are coupled by the modulation switching unit, the charge accumulated in the first photoelectric conversion unit is modulated into a voltage signal, and voltage signals having different conversion efficiencies are continuously read,
the charge accumulated in the first photoelectric conversion unit and the charge overflowing from the first photoelectric conversion unit during the accumulation period are modulated into a voltage signal and the voltage signal is read in a capacitance obtained by coupling the first charge modulation unit and the second charge modulation unit, and further, the charge generated in the second photoelectric conversion unit and accumulated in the charge accumulation unit is modulated into a voltage signal and the voltage signal is read in a capacitance obtained by coupling the first charge modulation unit, the second charge modulation unit, and the charge accumulation unit.

6. The solid-state imaging device according to claim 5, further comprising:
a second charge transfer unit provided between the second photoelectric conversion unit and the charge accumulation unit and configured to transfer the charge accumulated in the second photoelectric conversion unit to the charge accumulation unit.

7. A method of driving a solid-state imaging device including
a photoelectric conversion unit,
a charge transfer unit configured to transfer a charge accumulated in the photoelectric conversion unit,
a first charge modulation unit to which the charge is transferred from the photoelectric conversion unit by the charge transfer unit,
a second charge modulation unit,
a charge accumulation unit configured to accumulate a charge overflowing from the photoelectric conversion unit during an accumulation period,
a modulation switching unit configured to couple or divide the first charge modulation unit and the second charge modulation unit, and
a capacitance connection unit configured to couple or divide the second charge modulation unit and the charge accumulation unit,
the method comprising:
modulating the charge accumulated in the photoelectric conversion unit and continuously reading voltage signals having different conversion efficiencies in a state of the first charge modulation unit alone and a state where the first charge modulation unit and the second charge modulation unit are coupled by the modulation switching unit; and
further modulating the charge accumulated in the photoelectric conversion unit and the charge overflowing from the photoelectric conversion unit during the accumulation period into a voltage signal and reading the voltage signal in a capacitance obtained by coupling the first charge modulation unit, the second charge modulation unit, and the charge accumulation unit by the modulation switching unit and the capacitance connection unit.

8. An electronic device, comprising:
a solid-state imaging device including:
a photoelectric conversion unit,
a charge transfer unit configured to transfer a charge accumulated in the photoelectric conversion unit,
a first charge modulation unit to which the charge is transferred from the photoelectric conversion unit by the charge transfer unit,
a second charge modulation unit,
a charge accumulation unit configured to accumulate a charge overflowing from the photoelectric conversion unit during an accumulation period, a modulation switching unit configured to couple or divide the first charge modulation unit and the second charge modulation unit, and a capacitance connection unit configured to couple or divide the second charge modulation unit and the charge accumulation unit, in which, in a state of the first charge modulation unit alone and a state where the first charge modulation unit and the second charge modulation unit are coupled by the modulation switching unit, the charge accumulated in the photoelectric conversion unit is modulated into a voltage signal, and voltage signals having different conversion efficiencies are continuously read, and further, the charge accumulated in the photoelectric conversion unit and the charge overflowing from the photoelectric conversion unit during the accumulation period are modulated into a voltage signal and the voltage signal is read in a capacitance obtained by coupling the first charge modulation unit, the second charge modulation unit, and the charge accumulation unit by the modulation switching unit and the capacitance connection unit.

* * * * *